(12) United States Patent
Mochizuki et al.

(10) Patent No.: US 8,749,365 B2
(45) Date of Patent: *Jun. 10, 2014

(54) METHOD OF CONTROLLING A COLLISION WARNING SYSTEM USING LINE OF SIGHT

(75) Inventors: Yutaka Mochizuki, Novi, MI (US); Radovan Miucic, Southfield, MI (US)

(73) Assignee: Honda Motor Co., Ltd., Tokyo (JP)

(*) Notice: Subject to any disclaimer, the term of this patent is extended or adjusted under 35 U.S.C. 154(b) by 803 days.

This patent is subject to a terminal disclaimer.

(21) Appl. No.: 12/767,306

(22) Filed: Apr. 26, 2010

(65) Prior Publication Data

US 2011/0260846 A1  Oct. 27, 2011

(51) Int. Cl.
  *B60Q 1/00* (2006.01)
(52) U.S. Cl.
  USPC .............. 340/435; 340/436; 340/903
(58) Field of Classification Search
  USPC ............ 340/1.1, 3.1–3.41, 425.5, 435, 436, 340/901–903, 961
  See application file for complete search history.

(56) References Cited

U.S. PATENT DOCUMENTS

| | | | |
|---|---|---|---|
| 5,515,398 A * | 5/1996 | Walsh et al. | 375/222 |
| 6,275,180 B1 * | 8/2001 | Dean et al. | 342/70 |
| 6,370,475 B1 | 4/2002 | Breed et al. | |
| 6,405,132 B1 | 6/2002 | Breed et al. | |
| 6,526,352 B1 | 2/2003 | Breed et al. | |
| 6,707,378 B2 * | 3/2004 | MacNeille et al. | 340/435 |
| 6,720,920 B2 | 4/2004 | Breed et al. | |
| 6,759,948 B2 * | 7/2004 | Grisham et al. | 340/435 |
| 6,768,944 B2 | 7/2004 | Breed et al. | |
| 7,079,024 B2 | 7/2006 | Alarcon | |
| 7,085,637 B2 | 8/2006 | Breed et al. | |
| 7,095,336 B2 | 8/2006 | Rodgers et al. | |
| 7,110,880 B2 | 9/2006 | Breed et al. | |
| 7,202,776 B2 | 4/2007 | Breed | |
| 7,295,925 B2 | 11/2007 | Breed et al. | |
| 7,418,346 B2 | 8/2008 | Breed et al. | |
| 7,426,437 B2 | 9/2008 | Breed et al. | |
| 2007/0054685 A1 | 3/2007 | Kellum | |
| 2007/0225912 A1 | 9/2007 | Grush | |
| 2008/0015771 A1 | 1/2008 | Breed et al. | |
| 2008/0040023 A1 | 2/2008 | Breed et al. | |
| 2008/0040029 A1 | 2/2008 | Breed | |
| 2008/0042815 A1 | 2/2008 | Breed et al. | |
| 2008/0106436 A1 | 5/2008 | Breed | |
| 2008/0133136 A1 | 6/2008 | Breed et al. | |
| 2008/0140318 A1 | 6/2008 | Breed | |
| 2008/0147253 A1 | 6/2008 | Breed | |
| 2008/0150786 A1 | 6/2008 | Breed | |
| 2008/0154495 A1 | 6/2008 | Breed | |
| 2008/0154629 A1 | 6/2008 | Breed | |
| 2008/0161986 A1 | 7/2008 | Breed | |
| 2008/0161987 A1 | 7/2008 | Breed | |
| 2008/0162036 A1 | 7/2008 | Breed | |
| 2008/0165018 A1 | 7/2008 | Breed | |
| 2008/0167821 A1 | 7/2008 | Breed | |

* cited by examiner

*Primary Examiner* — James Yang

(74) *Attorney, Agent, or Firm* — Plumsea Law Group, LLC

(57) ABSTRACT

A collision warning system for a motor vehicle is disclosed. The collision warning system includes a first mode and a second mode. The system operates in the first mode when there is line of sight with a target vehicle. The system operates in the second mode where there is no line of sight with the target vehicle. The line of sight conditions are determined according to power delay spread characteristics or frequency response characteristics of signals from a vehicle communications network.

9 Claims, 17 Drawing Sheets

METHOD OF CONTROLLING A COLLISION WARNING SYSTEM USING LINE OF SIGHT

BACKGROUND

The present invention relates to motor vehicles and in particular to a collision warning system for a motor vehicle.

Collision warning systems have been previously proposed. Collision warning systems can alert a driver to potential hazards posed by other vehicles or objects near or on a roadway. Some collision warning systems use visual and/or audible messages to alert a driver of potential collisions.

SUMMARY OF THE INVENTION

The invention discloses an automated collision warning system. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted into kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a collision warning system in a motor vehicle, comprising the steps of: receiving a signal transmitted by a target vehicle; determining a power delay spread characteristic from the signal transmitted by the target vehicle; retrieving a reference power delay spread characteristic; determining a line of sight condition for the motor vehicle with respect to the target vehicle using the power delay spread characteristic and the reference power delay spread characteristic; and operating the collision warning system according to the line of sight condition.

In another aspect, the invention provides a method of operating a collision warning system in a motor vehicle, comprising the steps of: receiving a signal at a first antenna and a second antenna; determining a first frequency response for the signal associated with the first antenna and a second frequency response for the signal associated with the second antenna; calculating a measured antenna correlation using the first frequency response and the second frequency response; determining a line of sight condition for the motor vehicle with respect to the target vehicle using the measured antenna correlation; and operating the collision warning system according to the line of sight condition.

In another aspect, the invention provides a method of operating a collision warning system in a motor vehicle, comprising the steps of: receiving a signal; determining a measured power variance associated with the signal, the measured power variance being the variance of the power as a function of frequency; determining a line of sight condition for the motor vehicle with respect to the target vehicle using the measured power variance; and operating the collision warning system according to the line of sight condition.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
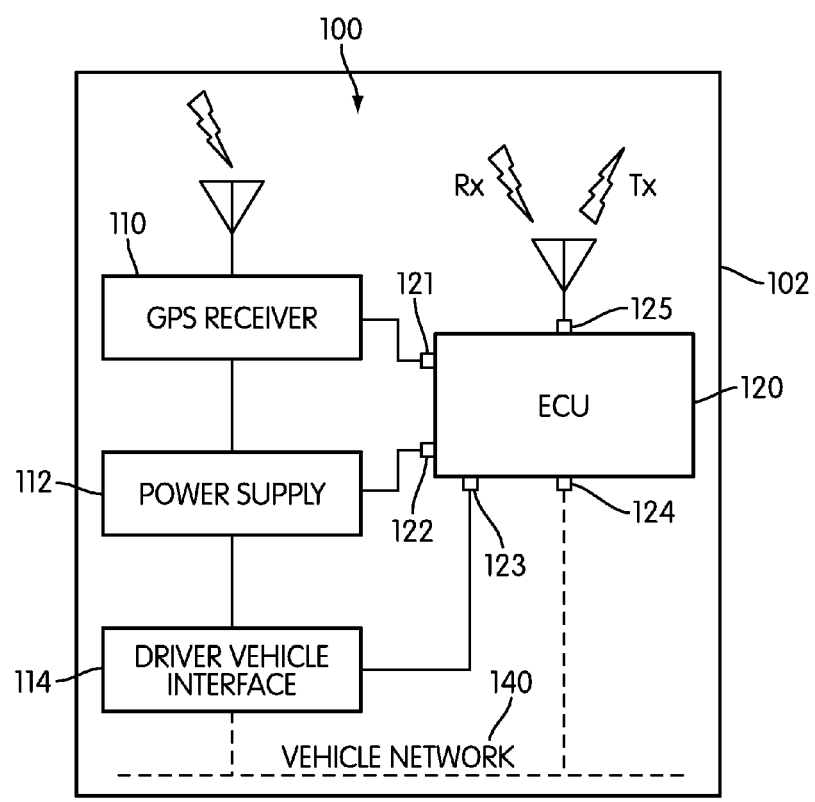
FIG. 1 is a schematic view of an embodiment of a collision warning system.

FIG. 1 is a schematic view of an embodiment of collision warning system 100 that is configured to be used within motor vehicle 102. Collision warning system 100 may be a system configured to detect potential collisions as well as to alert a driver or passenger to potential collisions. For purposes of clarity, only some components of a motor vehicle that may be relevant to collision warning system 100 are illustrated. Furthermore, in other embodiments, additional components can be added or removed.

Collision warning system 100 can include provisions for receiving GPS information. In some cases, collision warning system 100 can include GPS receiver 110. In an exemplary embodiment, GPS receiver 110 can be used for gathering GPS information for any systems of a motor vehicle, including, but not limited to: GPS based navigation systems.

Collision warning system 100 can include provisions for powering one or more devices. In some cases, collision warning system 100 can include power supply 112. Generally, power supply 112 can be any type of power supply associated with a motor vehicle. In some cases, power supply 112 can be a car battery. In other cases, power supply 112 can be another type of power supply available within motor vehicle 102.

Collision warning system 100 can include provisions for communicating with a driver. In some embodiments, collision warning system 100 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger.

Motor vehicle 102 may include provisions for communicating, and in some cases controlling, the various components associated with collision warning system 100. In some embodiments, collision warning system 100 may be associated with a computer or similar device. In the current embodiment, collision warning system may include electronic control unit 120, hereby referred to as ECU 120. In one embodiment, ECU 120 may be configured to communicate with, and/or control, various components of collision warning system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include first port 121 for communicating with GPS receiver 110. In particular, ECU 120 may be configured to receive GPS information from GPS receiver 110. In addition, ECU 120 can include second port 122 for receiving power from power supply 112. Also, ECU 120 can include third port 123 for communicating with driver vehicle interface 114. In particular, ECU 120 can be configured to transmit information to driver vehicle interface 114, as well as to receive information from driver vehicle interface 114.

A collision warning system can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include fifth port 125 that is configured to communicate with one or more DSRC devices. In an exemplary embodiment, fifth port 125 may be associated with a DSRC antenna that is configured to transmit and/or receive vehicle information over one or more vehicle communication networks. For purposes of clarity, only a single antenna is shown in communication with fifth port 125 in the current embodiment. In other embodiments, however, ECU 120 could be configured to communicate with two or more antennas.

Collision warning system 100 can include provisions for communicating with one or more components of a motor vehicle that are not associated directly, or indirectly with collision warning system 100. In some cases, ECU 120 may include additional ports for communicating directly with one or more additional devices of a motor vehicle, including various sensors or systems of the motor vehicle. In an exemplary embodiment, ECU 120 may include fourth port 124 for communicating with vehicle network 140. By providing communication between ECU 120 and vehicle network 140, ECU 120 may have access to additional information concerning motor vehicle 102. For instance, in some cases, ECU 120 may be configured to receive information related to various operating conditions of a motor vehicle. Examples of information that may be received via vehicle network 140 include, but are not limited to: vehicle speed, engine speed, braking conditions, as well as other parameters associated with the operating condition of motor vehicle 102.

A collision warning system can include provisions for controlling one or more systems in a motor vehicle that may be utilized during a collision, or that can be used to help avoid a collision. For example, in some embodiments, ECU 120 may be configured to communicate with a brake actuator to help control braking prior to, or during a collision. In other embodiments, ECU 120 may be configured to communicate with an electric seat belt pre-tensioner to help control a seat belt during a collision. In still other embodiments, any systems of a motor vehicle can be controlled using ECU 120. In some embodiments, ECU 120 can be configured with additional ports for communicating with other systems of a motor vehicle, including systems used during a collision. In other embodiments, ECU 120 can be configured to communicate with these systems using a vehicle network. With this arrangement, a collision warning system can be configured to control one or more systems that may be used to help avoid a collision or to increase the safety of one or more occupants during a collision.

Figure 2:
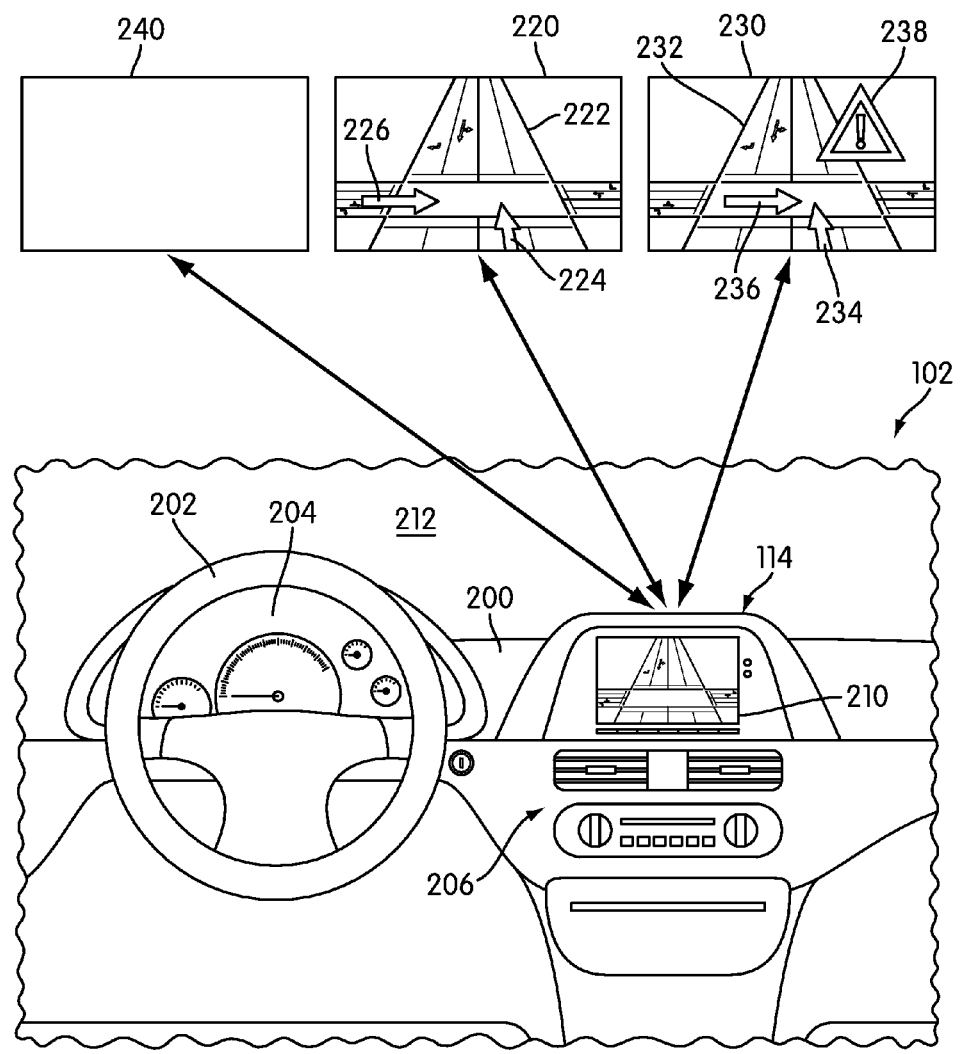
FIG. 2 is a schematic view of an embodiment of alert images for a collision warning system.

FIG. 2 illustrates an embodiment of dashboard 200 for motor vehicle 102. Dashboard 200 may include steering wheel 202 and instrument panel 204. In some embodiments, dashboard 200 can further include center portion 206. In some cases, center portion 206 can include one or more devices associated with an interior of a motor vehicle. Examples include, but are not limited to: audio devices, video devices, navigation devices, as well as any other types of devices. In addition, center portion 206 can be associated with controls for one or more systems of motor vehicle 102 including, but not limited to: climate control systems and other types of systems.

A motor vehicle can include provisions for displaying information from a collision warning system. In some embodiments, a motor vehicle can include a display device of some kind. In some cases, a motor vehicle can include a video screen for displaying information from a collision warning system. Examples of display devices include, but are not limited to: LCDs, CRTs, ELDs, LEDs, OLEDs, as well as other types of displays. In other cases, a display device could be a projection type display device that is configured to project an image onto one or more surfaces of motor vehicle 102. It will be understood that a display device may not be limited to a video screen or projection type display device.

In one embodiment, motor vehicle 102 can include display device 210. In some cases, display device 210 may be associated with driver vehicle interface 114 of collision warning system 100. In particular, display device 210 may be configured to present visual information received from collision warning system 100. In an exemplary embodiment, display device 210 may be an LCD screen.

In some embodiments, display device 210 can be disposed within center portion 206. However, it will be understood that in other embodiments, display device 210 can be located in any portion of motor vehicle 102 as long as display device 210 can be viewed by a driver. For example, in another embodiment, display device 210 may be a projection type device that displays an image onto front window 212. In addition, while display device 210 can be configured to present visual information received from collision warning system 100, display device 210 may be shared with other devices or systems within motor vehicle 100. For example, display device 210 could also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a collision warning system. In some cases, a driver vehicle interface can include an on/off button for turning a collision warning system on and off. In still another embodiment, a driver vehicle interface can be associated with speakers for generating auditory information.

A display device for a collision warning system can be configured to display one or more images associated with various types of alerts of the collision warning system. For purposes of clarity, the following detailed description discusses a collision warning system utilizing two distinct alert types: informing alerts and warning alerts. In particular, informing alerts are used to inform a driver of nearby vehicles or objects that could pose potential problems at a later time. In contrast, a warning alert may be issued to warn the driver of a serious threat of collision with a nearby vehicle or object. In other words, informing alerts inform a driver of low level collision threats, while warning alerts inform a driver of high level collision threats. In other embodiments, any other number of alert types can be used. In some cases, three or more alert types could be issued by a collision warning system.

In the exemplary embodiment, collision warning system 100 includes informing alert image 220 that is associated with an informational alert. Informing alert image 220 may comprise one or more symbols or icons. In this embodiment, informing alert image 220 includes intersection symbol 222, which indicates an upcoming intersection. In addition, informing alert image 220 includes first arrow 224 and second arrow 226, representing the general location and heading of motor vehicle 102 and an approaching vehicle for which there may some threat of collision. By displaying informing alert image 220, a driver is alerted to a potential collision threat with an approaching vehicle. This information may help a driver to be more aware as motor vehicle 102 approaches the upcoming intersection.

In the exemplary embodiment, collision warning system 100 also includes warning alert image 230 that is associated with a warning alert. Warning alert image 230 may comprise one or more symbols or icons. In a similar manner to informing alert image 220, warning alert image 230 may include intersection symbol 232, first arrow 234 and second arrow 236. These symbols indicate information about an upcoming intersection as well as the speeds and headings of motor vehicle 102 and an approaching vehicle. In addition, warning alert image 230 includes warning symbol 238. The appearance of warning symbol 238 alerts a driver to an immediate threat posed by an approaching vehicle. This information may help a driver to avoid a collision by taking immediate action.

In addition to the two types of alerts discussed above, a display device may be configured to display no image when no alert has been issued by collision warning system 100. In this embodiment, display device 210 displays default screen 240 when no alert is issued. In the exemplary embodiment, default screen 240 is associated with a blank screen of display device 210. However, in embodiments where display device 210 is used for displaying information from other systems, default screen 240 may not be a blank screen. For example, in embodiments where display device 210 is shared between a navigational system and collision warning system 100, display device 210 may continue to display images received from the navigation system until an alert is issued. Likewise, once an alert has expired, display device 240 may return to displaying images from a navigation system.

Although a single image is shown for each type of alert (informing alerts and warning alerts) in the current embodiment, other embodiments can include more than one image for each type of alert. In particular, an arrow used to indicate position and heading of a vehicle can be changed from a straight arrow indicating the intention of a vehicle to pass straight through an intersection to curved arrows in cases where the intention of the vehicle is to turn at the intersection. This arrangement can help to inform a driver as to the intentions of an approaching vehicle. In addition, a three way intersection symbol can be used in place of a four way intersection symbol in cases where the upcoming intersection is a three way intersection. However, in embodiments using multiple images for each type of alert, it will be understood that some distinguishing elements may be used to indicate that an alert is an informing alert or a warning alert. For example, as in the current embodiment, a warning symbol can be used to distinguish between informing alerts and warning alerts. Likewise, in some cases, informing alerts can be associated with a different color than warning alerts. In one embodiment, informing alerts can include symbols or icons colored in yellow, while warning alerts can include symbols or icons colored in red.

FIGS. 3 through 6 illustrate embodiments of a collision warning system in use. As previously discussed, motor vehicle 102 includes collision warning system 100. In particular, motor vehicle 102 includes provisions for communicating with one or more vehicles using a vehicle communication network. Also, motor vehicle 102 includes provisions for alerting a driver of potential collisions using either informing alerts or warning alerts.

Figure 3:
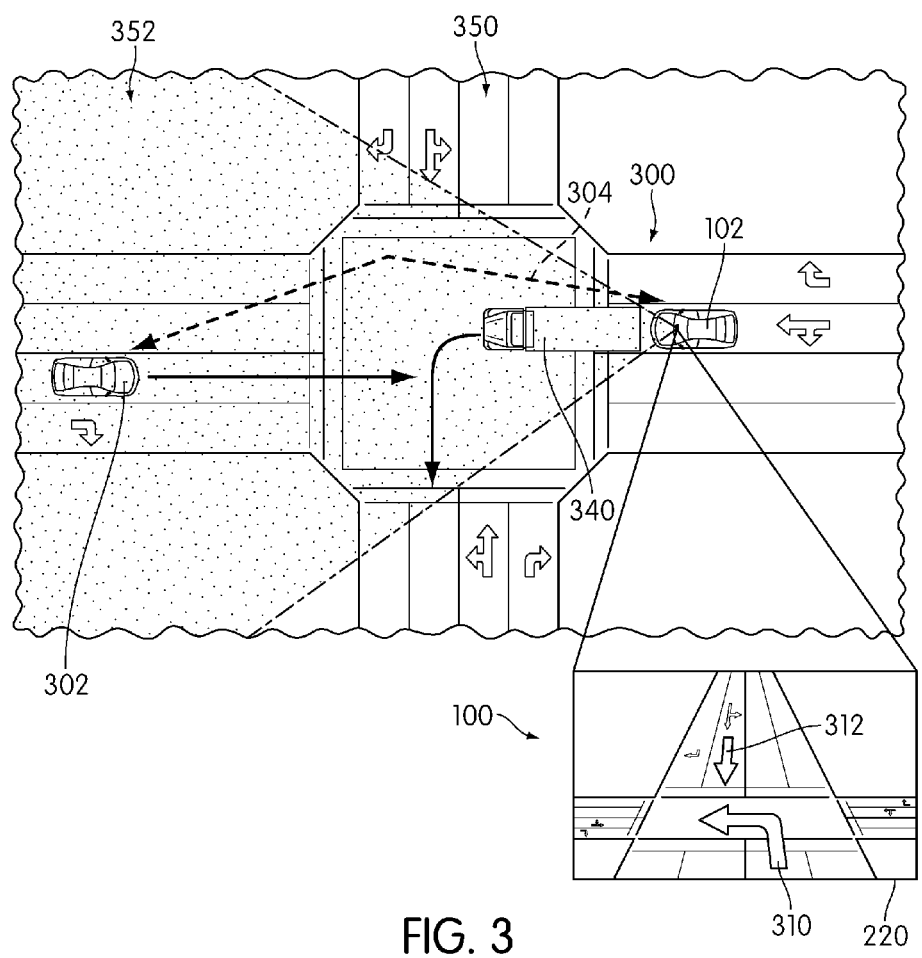
FIG. 3 is a schematic view of an embodiment of a collision warning system displaying an informing alert image.

Referring to FIG. 3, motor vehicle 102 is in communication with target vehicle 302 using vehicle communication network 304. The term "target vehicle" as used throughout this detailed description and in the claims refers to any vehicle about which a collision warning system could issue an alert. Furthermore, for clarity, a vehicle possessing a collision warning system may be referred to as a "subject vehicle", in contrast to the target vehicle. In particular, motor vehicle 102 is the subject vehicle in this embodiment.

In some cases, vehicle communication network 304 may be a DSRC network, as discussed above. In particular, using vehicle communication network 304, motor vehicle 102 and target vehicle 302 may be configured to exchange various types of information including, but not limited to: vehicle position, vehicle speed, vehicle trajectory as well as other types of vehicle information. In addition, any type of basic safety message (BSM) can be exchanged via vehicle communication network 304.

In an exemplary embodiment, each vehicle operating on vehicle communication network 304 is presumed to have a GPS antenna to determine vehicle locations. Using vehicle location information, velocities and headings for each vehicle can also be computed. In some cases, target vehicle 302 may simply transmit a current GPS position and motor vehicle 102 may calculate speed and heading according to the current GPS position. In other cases, target vehicle 302 can transmit each of these values independently.

In this embodiment, after receiving attributes from target vehicle 302, collision warning system 100 may determine if an alert should be issued. Since motor vehicle 102 is planning to make a left turn at intersection 300 and target vehicle 302 is planning to pass straight through intersection 300, there is potentially a threat of collision. In this case, collision warning system 100 issues an informing alert using informing alert image 220. Informing alert image 220 may include first arrow 310 and second arrow 312, indicating the planned trajectories of motor vehicle 102 and target vehicle 302, respectively. By displaying informing alert image 220, collision warning system 100 can inform a driver of motor vehicle 102 to a potential threat posed by target vehicle 302.

Figure 4:
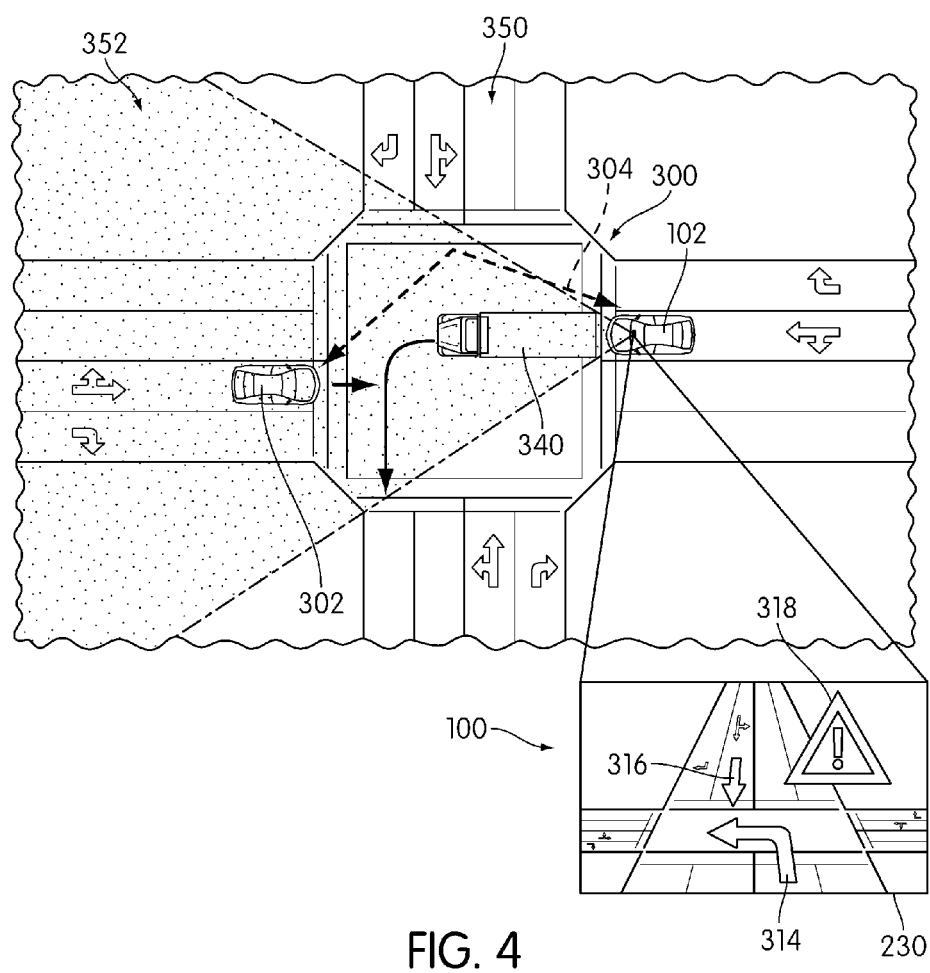
FIG. 4 is a schematic view of an embodiment of a collision warning system displaying a warning alert image.

Referring to FIG. 4, at a later time, target vehicle 302 is just about to enter intersection 300. At this point, collision warning system 100 may determine that the threat of collision is very high. In this case, collision warning system 100 issues a warning alert using warning alert image 230. Warning alert image 230 includes first arrow 314 and second arrow 316, indicating the planned trajectories of motor vehicle 102 and target vehicle 302, respectively. In contrast to the informing alert image illustrated in FIG. 3, warning alert image 230 also includes warning symbol 318, which indicates a serious threat of collision. By displaying warning alert image 230, collision warning system 100 can warn the driver of motor vehicle 102 to a serious collision threat posed by target vehicle 302. This warning may allow the driver to alter the current planned trajectory in order to avoid a collision.

In some cases, a driver may feel that a collision warning system issues too many alerts, especially informing alerts which may inform the driver about situations already known to the driver. For example, in situations where a driver has good line of sight of a target vehicle, an informing alert displaying the location and trajectory of the target vehicle may be seen as a nuisance. Some drivers may choose to deactivate a collision warning system rather than put up with these "nuisance alerts."

A collision warning system can include provisions for reducing the number of alerts issued to a driver. In some embodiments, a collision warning system can be configured to prevent informing alerts from being issued when a driver has good line of sight to a target vehicle. In some cases, a collision warning system can be configured to operate in two or more alert modes. A first alert mode may be used when the driver has good line of sight of a target vehicle. A second alert mode may be used when the driver does not have line of sight of a target vehicle. In an exemplary embodiment, the first alert mode may be referred to as a normal alert mode. The second alert mode may be referred to as an enhanced alert mode. Furthermore, during the normal alert mode, a collision warning system may issue less warnings since a driver can see the target vehicle clearly. In contrast, the enhanced alert mode may be associated with a higher frequency of issued alerts, since the driver cannot see the target vehicle, and thus could benefit from additional information to avoid potential collisions.

Referring to FIGS. 3 and 4, motor vehicle 102 is situated behind truck 340. Because of this arrangement, the line of sight from within motor vehicle 102 is reduced. For purposes of illustration, intersection 300 and the surrounding area is divided into visible region 350 and non-visible region 352. In other words, from within motor vehicle 102 a driver is able to see everything located within visible region 350, but the driver is unable to see objects located within non-visible region 352, due to the presence of truck 340 in front of motor vehicle 102. Since target vehicle 302 is within non-visible region 352, a driver inside of motor vehicle 102 cannot see target vehicle 302. In addition, a direct communication path between subject vehicle 102 and target vehicle 302 is obstructed by truck 240. However, by using the reflection wave path or the diffraction wave path of a communication signal, vehicle communication network 304 may still be established. In this situation, collision warning system 100 is operated in the enhanced alert mode. In particular, as discussed above, displaying informing alert image 220 gives a driver useful information about target vehicle 302 that is not considered a nuisance. In a similar manner, as target vehicle 302 gets closer to intersection 300, collision warning system 100 issues warning alert image 230. In this situation, a driver may not be aware of an impending collision since target vehicle 302 is located within non-visible region 352 and is not in the line of sight of the driver.

Figure 5:
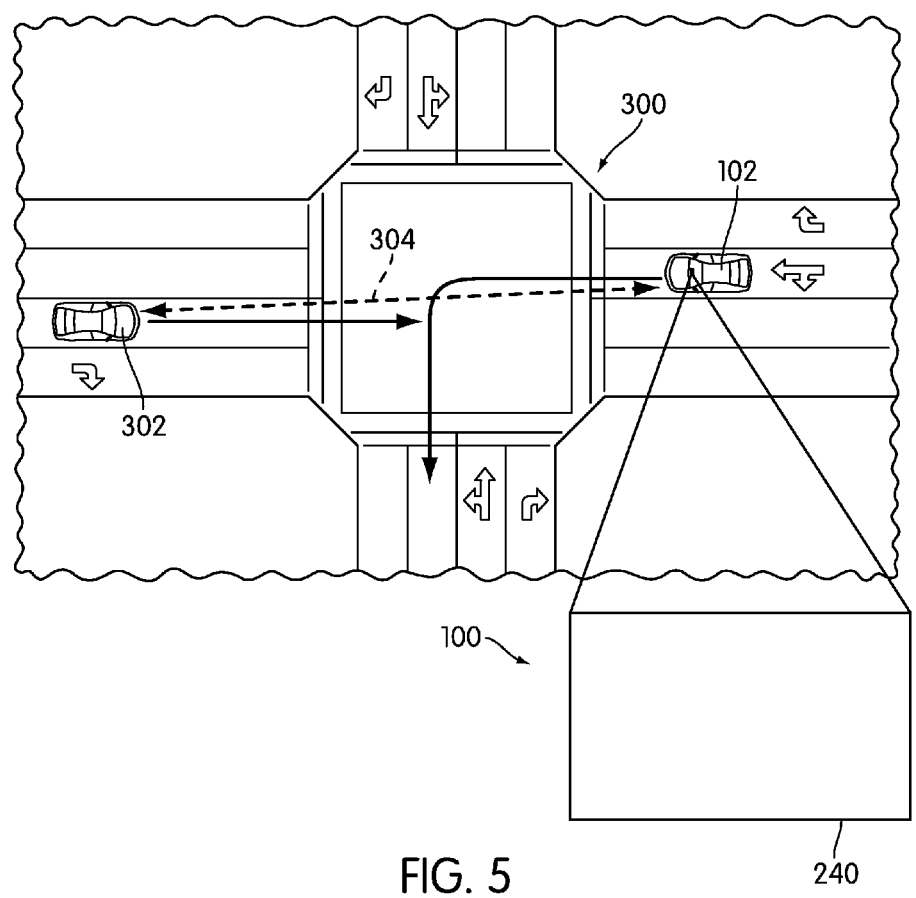
FIG. 5 is a schematic view of an embodiment of a collision warning system displaying a default screen.
Figure 6:
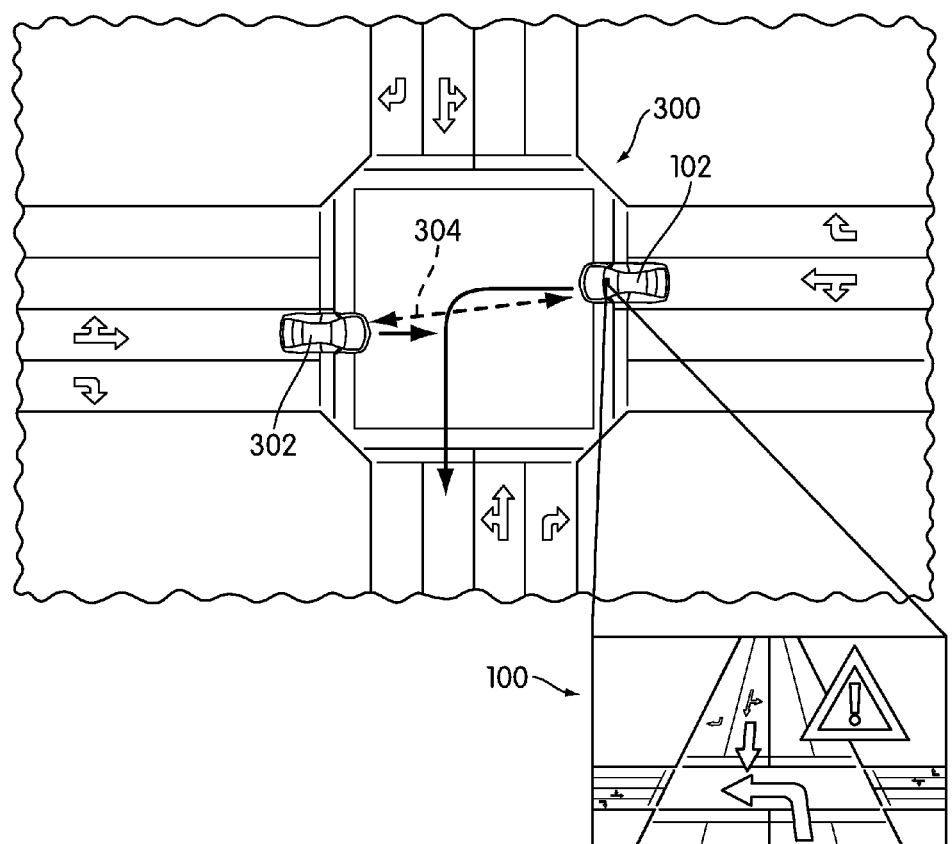
FIG. 6 is a schematic view of an embodiment of a collision warning system displaying a warning alert image.

In contrast, FIGS. 5 and 6 illustrate embodiments of collision warning system 100 operating in a normal alert mode. In this case, the line of sight of motor vehicle 102 is not obstructed. Also, in this case, vehicle communication network 304 is established using a direct wave path. In particular, a driver within motor vehicle 102 can see target vehicle 302. In this situation, collision warning system 100 may determine that the driver has good line of sight of target vehicle 302 and therefore no informing alert is necessary. In the exemplary embodiment, default image 240 is shown on a display screen associated with collision warning system.

As seen in FIG. 6, as target vehicle 302 enters intersection 300, collision warning system may determine that the threat of a collision is very high. Therefore, at this point, collision warning system 100 may issue warning alert image 230 even though the driver has good line of sight of target vehicle 302.

With the arrangement discussed here, the number of alerts issued by a collision warning system can be modified according to the line of sight conditions. In particular, during normal alert mode, the collision warning system only issues warning alerts. In other words, the collision warning system only issues alerts when the threat of collision is high. In contrast, during the enhanced alert mode, the collision warning system may issue both informing alerts and warning alerts. This arrangement can help prevent deactivation of a collision warning system from annoyed drivers.

As discussed above, communications between two vehicles can be established using direct paths as well as reflection wave paths or diffraction wave paths. In particular, direct paths for signals associated with a vehicle communication network may be used when two vehicles have line of sight of one another. In addition, reflection wave paths or diffraction wave paths for signals associated with a vehicle communication network may be used when there is not good line of sight between vehicles, since a direct path may be obstructed by one or more objects in such cases. With this arrangement, a vehicle communication network can be established during both good line of sight conditions and non-line of sight conditions.

Figure 7:
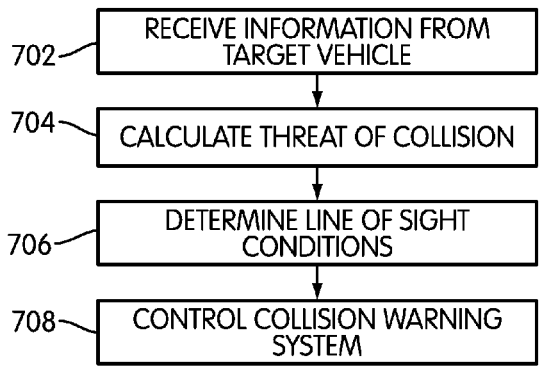
FIG. 7 is an embodiment of a process for controlling a collision warning system.

FIG. 7 illustrates an embodiment of a process for operating a collision warning system. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional. Furthermore, in some embodiments, the process could include additional steps.

During step 702, ECU 120 may receive information from a target vehicle. In some cases, the information can be received from a vehicle communication network, such as a DSRC network. The information can include, in some cases, the location, speed and heading of the target vehicle. In other cases, additional information about the target vehicle can be received, including vehicle make, vehicle model, size information, shape information as well as other types of information about the target vehicle.

Next, during step 704, ECU 120 can calculate the threat of a collision. In some embodiments, the threat of collision can be associated with two or more discrete threat levels. In some cases, the threat of collision can be associated with "no threat," "low threat" or "high threat" levels. In other cases, the threat of collision can be associated with additional threat levels. In other embodiments, the threat of collision can be associated with a continuous value. For example, the threat of collision can be a value between 0 and 100, with 0 being no threat and 100 being the highest threat level. For purposes of clarity, the following detailed description discusses an embodiment utilizing the three discrete threat levels discussed above.

Following step 704, ECU 120 can proceed to step 706. During step 706, ECU 120 can determine the line of sight conditions for the driver of the motor vehicle. In particular, during step 706, ECU 120 can determine that the driver has line of sight of the target vehicle or that the driver does not have line of sight of the target vehicle.

Finally, during step 708, ECU 120 can control the collision warning system. In some cases, ECU 120 can use the threat of a collision and the line of sight conditions to determine whether or not to issue an alert as well as to determine what type of alert to issue.

Figure 8:
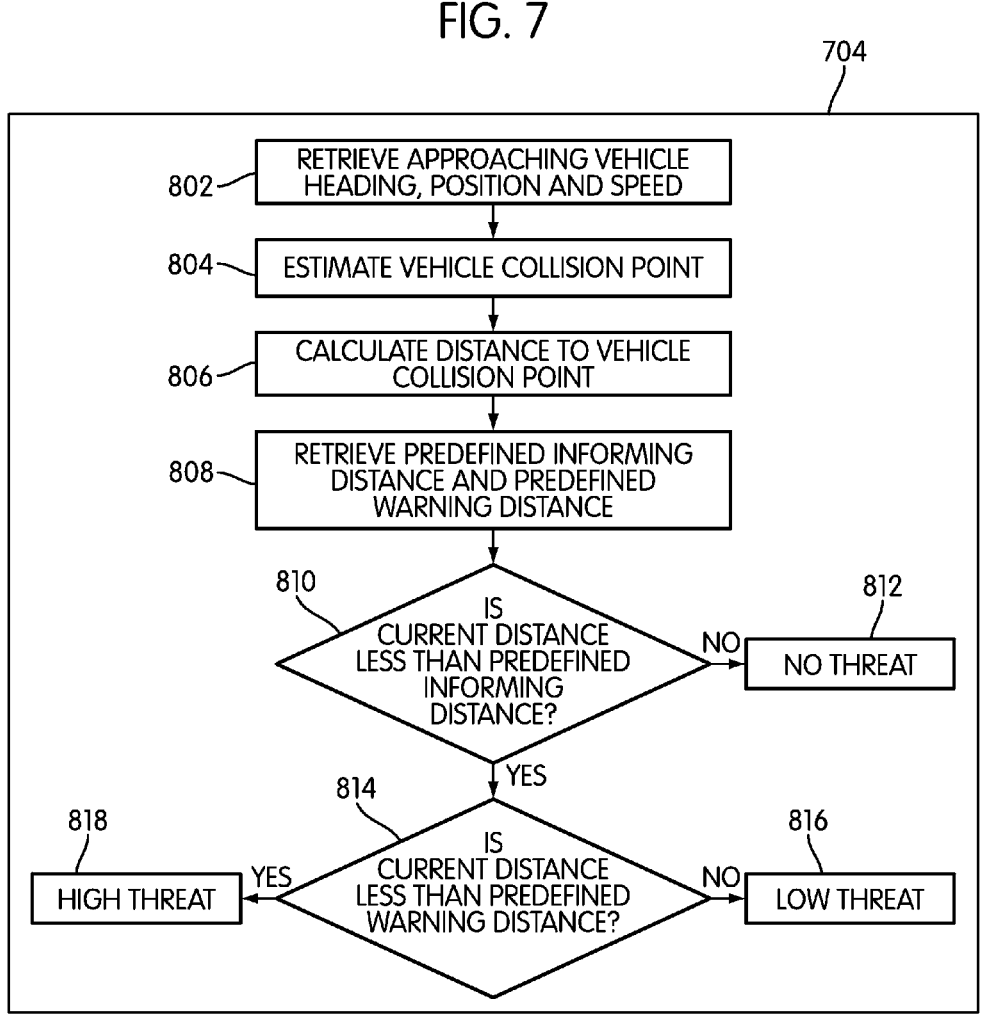
FIG. 8 is an embodiment of a process for calculating a threat of collision between a motor vehicle and a target vehicle.

FIG. 8 illustrates an embodiment of a process for calculating the threat of collision. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 802, ECU 120 can retrieve the heading, position and speed of a target vehicle using a vehicle communication network. Next, during step 804, ECU 120 may estimate a vehicle collision point. The term "vehicle collision point" refers to a point at which the motor vehicle and the target vehicle would collide given current headings, positions and speeds for both vehicles. In addition, ECU 120 may use other available information for estimating a vehicle collision point, such as the intention of one or both drivers to turn at an upcoming intersection.

Following step 804, ECU 120 may proceed to step 806. During step 806, ECU 120 may calculate the distance to the vehicle collision point. At this point, ECU 120 proceeds to step 808. During step 808, ECU 120 retrieves a predefined informing distance and a predefined warning distance. In other words, the predefined informing distance is a distance from the vehicle collision point within which the collision warning system may determine that there is a low threat of collision. Likewise, the predefined warning distance is a distance from the vehicle collision point within which the collision warning system may determine that there is a high threat of collision.

Following step 808, ECU 120 may proceed to step 810. During step 810, ECU 120 may determine if the current distance to the vehicle collision point is less than the predefined informing distance. If ECU 120 determines that the current distance to the vehicle collision point is not less than the predefined informing distance, ECU 120 may proceed to step 812, where ECU 120 determines that there is no threat. Otherwise, ECU 120 proceeds to step 814.

During step 814, ECU 120 determines if the current distance to the vehicle collision point is less than the predefined warning distance. If ECU 120 determines that the current distance to the vehicle collision point is not less than the predefined warning distance, ECU 120 may proceed to step 816. During step 816, ECU 120 determines that there is a low threat level. If, during step 814, ECU 120 determines that the current distance to the vehicle collision point is less than the predefined warning distance, ECU 120 proceeds to step 818. During step 818, ECU 120 determines that there is a high threat level.

It will be understood that the current embodiment of a process for determining a threat of collision is only intended to be exemplary. Generally, any method of determining a threat level according to information related to a primary vehicle and a target vehicle may be used. In other embodiments, a collision warning system can use another process for determining a threat of collision. For example, in another embodiment, rather than calculating a distance to the vehicle collision point, a time to vehicle collision point can be calculated and compared with a predefined informing alert time as well as a predefined warning alert time.

Figure 9:
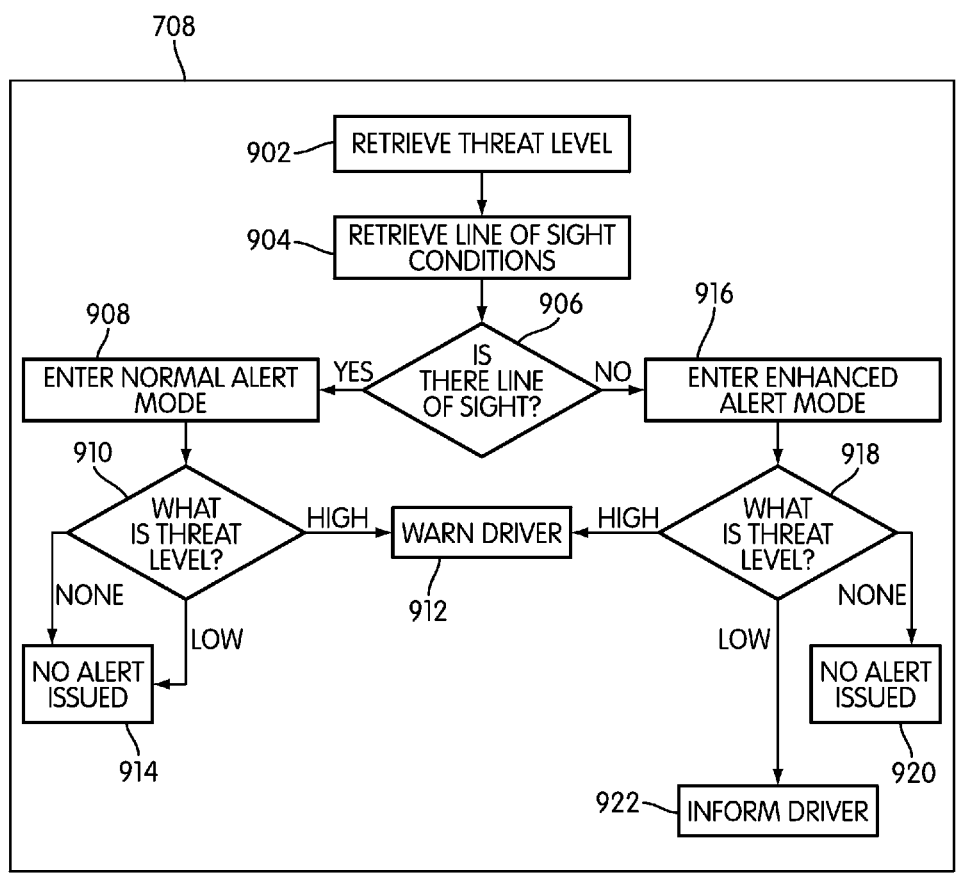
FIG. 9 is an embodiment of a process for controlling a collision warning system.

FIG. 9 illustrates an embodiment of a process for operating collision warning system 100. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 902, ECU 120 may receive the threat level. In some cases, the threat level may be calculated using the method discussed above. Next, ECU 120 may receive the line of sight conditions during step 904. In particular, ECU 120 can determine if a target vehicle is within the line of sight of a driver.

Following step 904, ECU 120 can proceed to step 906. During step 906, ECU 120 may determine if there is line of sight according to the line of sight conditions received during step 904. If there is line of sight, ECU 120 may proceed to step 908. During step 908, ECU 120 puts collision warning system 100 in a normal alert mode.

Following step 908, ECU 120 can proceed to step 910. During step 910, ECU 120 determines the threat level according to the threat level received during step 902. If, during step 910, ECU 120 determines that the threat level is high, ECU 120 proceeds to step 912, where a warning alert is issued. Otherwise, if ECU 120 determines that the threat level is low or that there is no threat, ECU 120 proceeds to step 914. During step 914, no alert is issued.

Returning to step 906, if ECU 120 determines that there is no line of sight, ECU 120 may proceed to step 916. During step 916, ECU 120 puts collision warning system 100 in an enhanced alert mode. In particular, the enhanced alert mode is a mode of collision warning system 100 associated with a high frequency of informing alerts due to the inability of the driver to see the target vehicle.

Following step 916, ECU 120 can proceed to step 918. During step 918, ECU 120 determines the threat level according to the threat level received during step 902. If, during step 918, ECU 120 determines that there is no threat, ECU 120 proceeds to step 920, where no alert is issued. If, during step 920, ECU 120 determines that there is a low threat, ECU 120 may proceed to step 922, where an informing alert is issued. If, during step 920, ECU 120 determines that the threat level is high, ECU 120 proceeds to step 912, where a warning alert is issued.

A collision warning system can include provisions for determining line of sight conditions for a motor vehicle. In some embodiments, the collision warning system can use information associated with a vehicle communication network to determine line of sight conditions. In an exemplary embodiment, the collision warning system can use characteristics of a received signal associated with a vehicle communication network to determine line of sight conditions.

FIGS. 10 through 14 illustrate a schematic embodiment of a method for determining line of sight conditions using information related to the power delay spread of a signal. The term "delay spread" as used throughout this detailed description and in the claims refers to a distortion that occurs when identical signals arrive at a receiver at different times. In particular, signals in a vehicle communication system may reach a receiving antenna by two or more paths of differing lengths, causing a delay between the arrival times of the different signals. As each path component of a signal arrives at an antenna, an impulse of energy is received at the antenna. This multipath propagation of a signal can occur for many different reasons including reflections from various objects such as buildings or other vehicles.

The power delay spread of a signal includes information about the relative power of each impulse that is received at different delay times. In different embodiments, a system can include provisions for using various power delay spread characteristics to determine line of sight conditions. The term "power delay spread characteristic" refers to any statistical characteristics that can be determined from a power delay spread of a signal. In one embodiment, a system can use the root mean square of the power delay spread (the RMS power delay spread) to determine line of sight conditions. A detailed description of the RMS power delay spread is discussed below. In some embodiments, line of sight conditions may be associated with relatively low RMS power delay spread values, while non-line of sight conditions may be associated with relatively high RMS power delay spread values. In other embodiments, different statistical characteristics of a delay spread can be used to determine line of sight conditions. In another embodiment, for example, the mean excess delay could be used to determine line of sight conditions. In other embodiments, any other statistical characteristics of the delay spread could be used to determine line of sight conditions.

Figure 10:
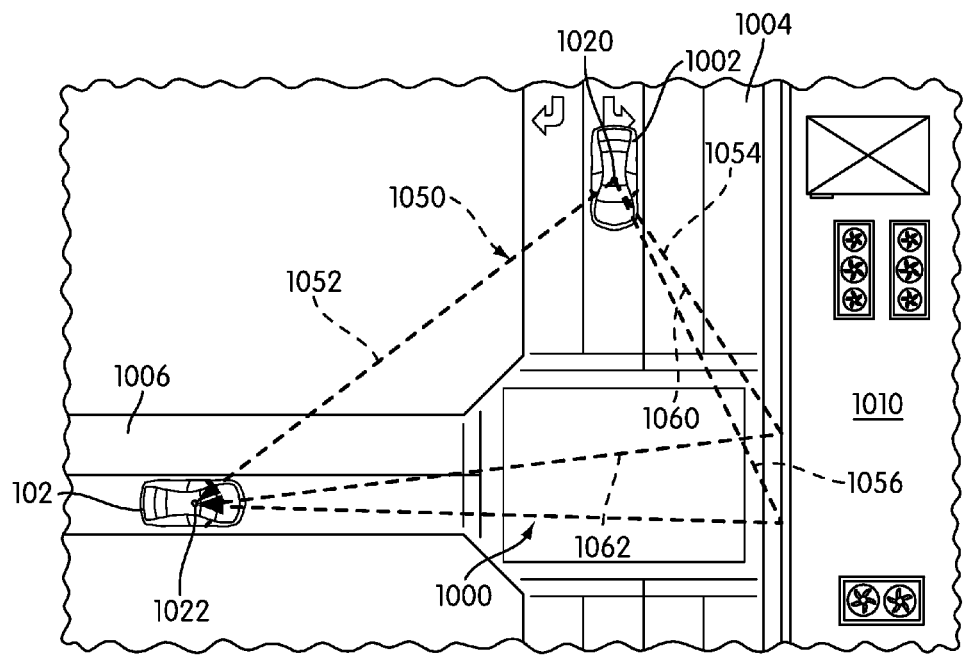
FIG. 10 is a schematic view of an embodiment of a target vehicle and a motor vehicle approaching an intersection with good line of sight.

Referring to FIG. 10, motor vehicle 102 is approaching intersection 1000 along second street 1006. In addition, target vehicle 1002 is approaching intersection 1000 along first street 1004. Furthermore, building 1010 is disposed on first street 1004. In this case, motor vehicle 102 is traveling in an approximately perpendicular direction to building 1010, while target vehicle 1002 is traveling in an approximately parallel direction to building 1010.

In one embodiment, motor vehicle 102 and target vehicle 1002 may be in communication via a vehicle communication network, as discussed above. In particular, motor vehicle 102 and target vehicle 1002 may be constantly transmitting information to, and receiving information from, one another in the form of wireless signals. In this case, target vehicle 1002 is provided with first antenna 1020 for transmitting and receiving signals associated with a vehicle communication network. Likewise, motor vehicle 102 is provided with second antenna 1022 for transmitting and receiving signals associated with a vehicle communication network.

In the current embodiment, signal 1050 is transmitted from first antenna 1020 of target vehicle 1002. Signal 1050 further comprises first path component 1052 and second path component 1054. In particular, first path component 1052 is a straight line component, also referred to as a line of sight component, which travels directly between first antenna 1020 of target vehicle 1002 and second antenna 1022 of motor vehicle 102, since no obstructions exist between target vehicle 1002 and motor vehicle 102. In contrast, second path component 1054 is a reflective path component. In particular, second path component 1054 travels along first path segment 1060 between first antenna 1020 and building 1010. At this point, second path component 1054 is reflected off building 1010 in a direction towards motor vehicle 102. Following this reflection, second path component 1054 travels along second path segment 1062 between building 1010 and second antenna 1022 of motor vehicle 102.

In a similar manner, additional path components of signal 1050 may travel from first antenna 1020 to second antenna 1022 along various distinct paths. In this case, third path component 1056 also travels between first antenna 1020 and second antenna 1022. In particular, third path component 1056 also has reflective path components that are reflected by building 1010. For purposes of clarity, only some path components associated with signal 1050 are illustrated in the current embodiment. Generally, a transmitted signal can be associated with any number of path components. In some cases, variation in the number of path components may occur according to the number of objects from which the signal can be reflected in traveling between a transmitting antenna and a receiving antenna. The methods discussed below can be used with any number of path components.

The arrangement discussed here results in time delays between the arrival of each different path component of signal 1050. These delays are caused by the differences in the distances over which each path component travels. For example, since first path component 1052 takes a straight line path between first antenna 1020 and second antenna 1022, first path component 1052 travels a shorter distance than each of second path component 1054 and third path component 1056. Likewise, the distances traveled by each of second path component 1054 and third path component 1056 may vary slightly. Since each path component travels at approximately the speed of light, the arrival times of each path component at second antenna 1022 will vary slightly because of the different path lengths of each path component. Moreover, the power of each path component received at second antenna 1022 will also vary due to the differences in length of each path component.

Figure 11:
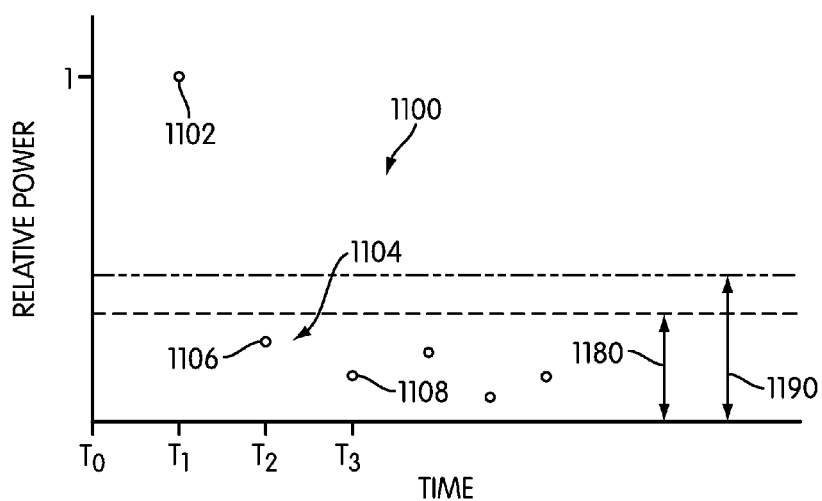
FIG. 11 is a schematic view of an embodiment of a relationship between power and time of a signal received at a receiving antenna of a motor vehicle.

FIG. 11 illustrates an embodiment of a relationship of the relative power of a path component received at second antenna 1022 as a function of the delay time. In particular, in the current embodiment, the received power of each path component of signal 1050 is normalized so that the most powerful path component has a value of 1. Referring to FIG. 11, power delay spread profile 1100 comprises a series of impulses that are detected at second antenna 1022 and associated with the arrival of various path components of signal 1050. In this embodiment, power delay spread profile 1100 comprises direct path impulse 1102 and plurality of reflected path impulses 1104. Direct path impulse 1102 indicates the power received at second antenna 1022 due to the arrival of first path component 1052. In this case, first impulse 1102 is associated with delay time T1. Plurality of reflected path impulses 1104 include first reflected path impulse 1106 and second reflected path impulse 1108, which are associated with second path component 1054 and third path component 1056, respectively. Moreover, first reflected path impulse 1106 is associated with delay time T2 and second reflected path impulse 1108 is associated with delay time T3. Plurality of reflected path impulses 1104 may also include additional impulses associated with additional reflected paths for signal 1050. In this case, the relative power of direct impulse 1102 is substantially greater than the relative power of plurality of reflected path impulses 1104.

As previously discussed, a collision warning system can be configured to calculate a RMS power delay spread for determining line of sight conditions. In different embodiments, the RMS power delay spread can be calculated in various ways. In one embodiment, the RMS power delay spread may be calculated by taking the root mean square of the relative power of each of the impulses received for each different path component of the signal. Mathematical formulations for the RMS power delay spread are known in the art. In some cases, discrete formulations for the RMS power delay spread can be used. In other cases, continuous formulations for the RMS power delay spread can be used. It will be understood that the current method is not intended to be limited to any particular mathematical formulation for the RMS power delay spread.

In the current embodiment, collision warning system 100 may be configured to calculate a RMS power delay spread for power delay spread profile 1100. In this case, upon receiving a series of impulses at second antenna 1022, collision warning system 100 may be configured to calculate a measured RMS power delay spread for power delay spread profile 1100. For purposes of illustration, measured RMS power delay spread 1180 is indicated schematically in the current embodiment. After calculating a measured RMS power delay spread, collision warning system 100 may compare measured RMS power delay spread 1180 to reference RMS power delay spread 1190. In this embodiment, for example, collision warning system 100 may determine that measured RMS power delay spread 1180 is less than reference RMS power delay spread 1190. Therefore, collision warning system 100 may determine that motor vehicle 102 has line of sight of target vehicle 1002.

Figure 12:
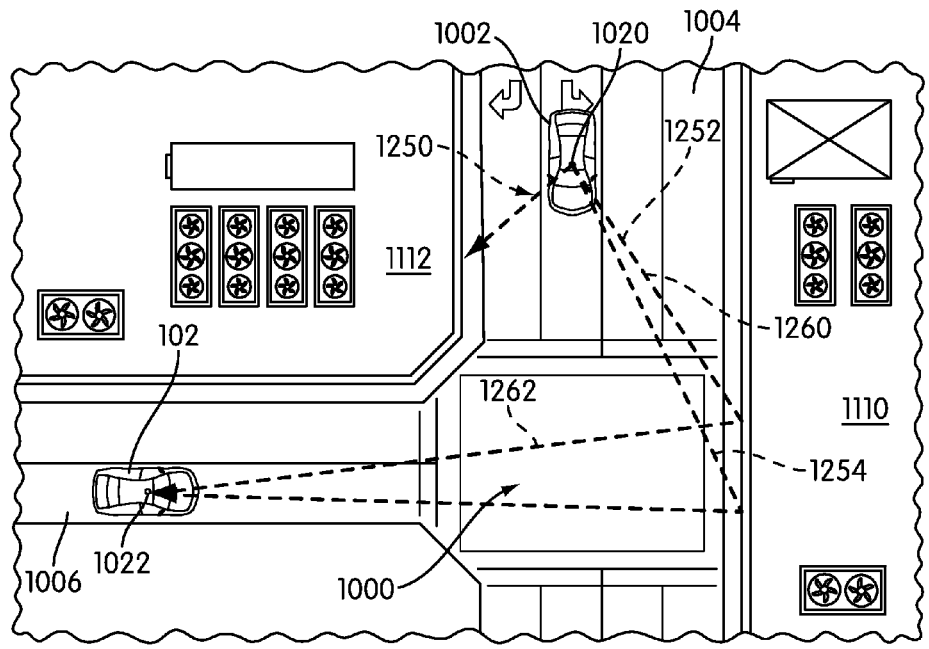
FIG. 12 is a schematic view of an embodiment of a target vehicle and a motor vehicle approaching an intersection with no line of sight.

Referring now to FIG. 12, in situations where no line of sight path exists between a motor vehicle and a target vehicle, the measured RMS power delay spread may vary compared to line of sight situations. In this embodiment, motor vehicle 102 is approaching intersection 1000 along second street 1006. In addition, target vehicle 1002 is approaching intersection 1000 along first street 1004. Furthermore, first building 1110 is disposed on first street 1004. In this case, motor vehicle 102 is traveling in an approximately perpendicular direction to first building 1110, while target vehicle 1002 is traveling in an approximately parallel direction to first building 1110.

In this embodiment, second building 1112 is disposed at the corner of first street 1004 and second street 1006. In this case, the line of sight of a driver within motor vehicle 102 is obscured by second building 1112. For example, a driver within motor vehicle 102 is unable to see any vehicles on the portion of first street 1004 that is adjacent to second building 1112. In this situation, a driver within motor vehicle 102 is unable to see target vehicle 1002.

In the current embodiment, signal 1250 is transmitted from first antenna 1020 of target vehicle 1002. Signal 1250 comprises first path component 1252. In this embodiment, first path component 1252 is a reflective path component. In particular, first path component 1252 travels along first path segment 1260 between first antenna 1020 and first building 1110. At this point, first path component 1252 is reflected off first building 1110 in a direction towards motor vehicle 102. Following this reflection, first path component 1252 travels along second path segment 1262 between first building 1110 and second antenna 1022 of motor vehicle 102. Additionally, for purposes of illustration, second path component 1254 is also shown in FIG. 12. In particular, second path component 1254 is also a reflected path component.

In contrast to the embodiment illustrated in FIG. 10, signal 1250 does not include a straight line, or line of sight, component. Instead, a straight line component of signal 1250 is obstructed by second building 1112. In some cases, for example, signal 1250 is not strong enough to penetrate through second building 1112. Since no line of sight path component is received at second antenna 1022, the delay spread profile of signal 1250 may vary from the delay spread profile illustrated in FIG. 11.

Figure 13:
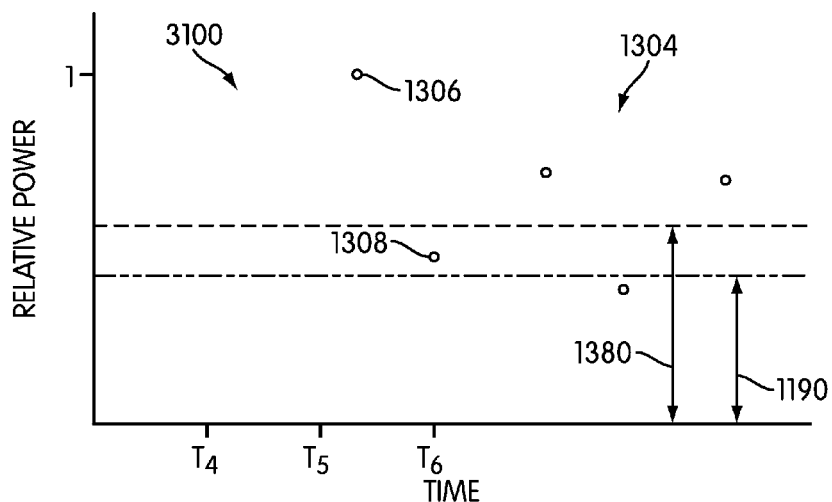
FIG. 13 is a schematic view of an embodiment of a relationship between power and time of a signal received at a receiving antenna of a motor vehicle.

FIG. 13 illustrates an embodiment of a relationship of the relative power of a path component received at second antenna 1022 as a function of the delay time. In particular, in the current embodiment, the received power of each path component of signal 1250 is normalized so that the most powerful path component has a value of 1. Referring to FIG. 13, power delay spread profile 1300 comprises a series of impulses that are detected at second antenna 1022 and associated with the arrival of various path components of signal 1250. In this embodiment, delay spread profile 1300 comprises plurality of reflected path impulses 1304. In this case, plurality of reflected path impulses 1304 includes first reflected path impulse 1306 and second reflected path impulse 1308. First reflected path impulse 1306 indicates the power received at second antenna 1022 due to the arrival of first path component 1252. In this case, first reflected path impulse 1306 is associated with delay time T5. Second reflected path impulse 1308 indicates the power received at second antenna 1022 due to the arrival of second path component 1254. In this case, second reflected path impulse 1308 is associated with delay time T6. Furthermore, delay time T4 indicates the time at which a line of sight path component would have been received at second antenna 1022. Additionally, delay spread profile 1300 comprises additional impulses associated with other path components of signal 1250. In contrast to the embodiment illustrated in FIG. 11 for a delay spread profile with a line of sight component, power delay spread profile 1300 is not dominated by a single impulse. Instead, the relative power of each impulse varies more than the relative power of the impulses received during line of sight conditions.

In the current embodiment, collision warning system 100 may be configured to calculate a RMS power delay spread for power delay spread profile 1100. In this case, upon receiving a series of impulses at second antenna 1022, collision warning system 100 may be configured to calculate a measured RMS power delay spread for power delay spread profile 1100. For purposes of illustration, measured RMS power delay spread 1380 is indicated schematically in the current embodiment. After calculating a RMS power delay spread value, collision warning system 100 may compare measured RMS power delay spread 1380 to a reference RMS power delay spread. In this embodiment, for example, collision warning system 100 may determine that measured RMS power delay spread 1380 is greater than reference RMS power delay spread 1190. Therefore, collision warning system 100 may determine that motor vehicle 102 does not have line of sight of target vehicle 1002. Using the arrangement discussed here for calculating a RMS power delay spread for a multipath component signal, a collision warning system can estimate line of sight conditions.

Figure 14:
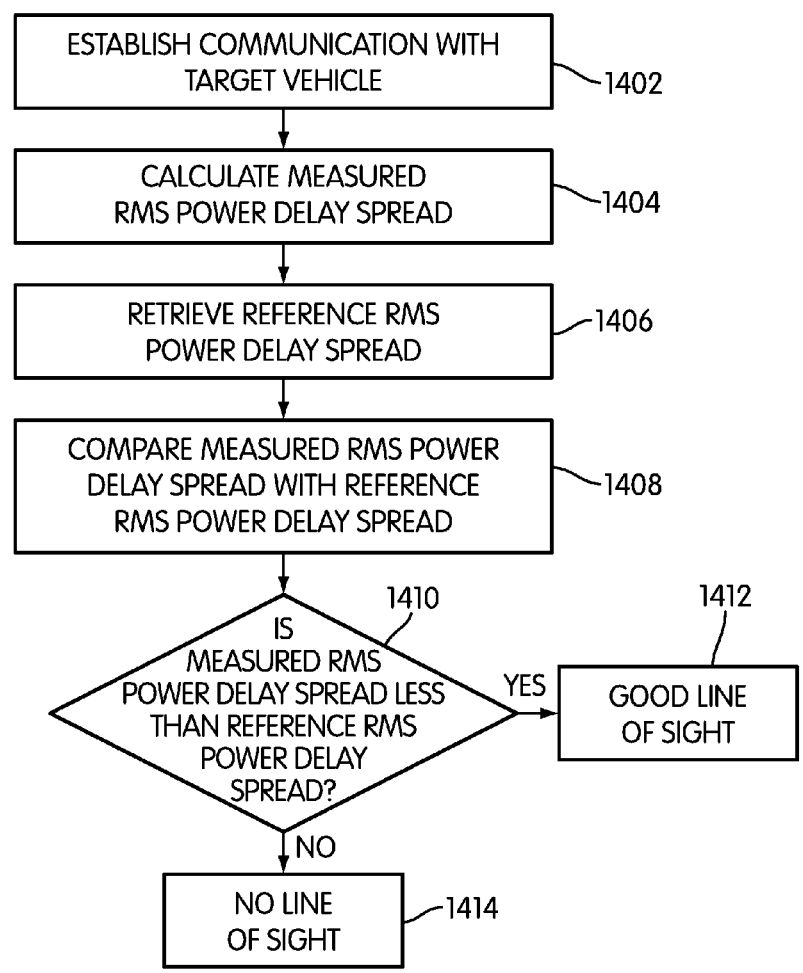
FIG. 14 is an embodiment of a process for determining line of sight.

FIG. 14 illustrates an exemplary embodiment of a general process for determining line of sight according to a power delay spread characteristic of a signal. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 1402, ECU 120 may establish a connection with a target vehicle using a vehicle communication network. Following step 1402, ECU 120 may proceed to step 1404. During step 1404, ECU 120 may calculate a measured RMS power delay spread for the received signal. Next, during step 1406, ECU 120 can retrieve a reference RMS power delay spread.

Generally, ECU 120 may use any method for retrieving a reference RMS power delay spread. In some cases, ECU 120 may use a look-up table to retrieve a reference RMS power delay spread as a function of distance. In other cases, ECU 120 may use a predetermined function for calculating a reference RMS power delay spread as a function of any parameter. In still other cases, any other method can be used for retrieving a reference RMS power delay spread. In an exemplary embodiment, the reference RMS power delay spread may be a constant value.

At this point, ECU 120 may proceed to step 1408, where the measured RMS power delay spread is compared with the reference RMS power delay spread value. Following step 1408, ECU 120 may proceed to step 1410. During step 1410, ECU 120 may determine if the measured RMS power delay spread is substantially less than the reference RMS power delay spread according to the comparison made during step 1408. If, during step 1410, ECU 120 determines that the measured RMS power delay spread is less than the reference RMS power delay spread, then ECU 120 may proceed to step 1412, where it is determined that the driver of motor vehicle 102 has good line of sight. Otherwise, ECU 120 may proceed to step 1414, where it is determined that the driver of motor vehicle 102 does not have line of sight.

A collision warning system can include provisions for determining line of sight conditions using frequency information from incoming signals. The term "frequency response" as used throughout this detailed description and in the claims refers to the amount of power measured at a receiving antenna as a function of frequency for one or more signals. Generally, the frequency response of an incoming signal can be determined in any manner. In some cases, the frequency response of a signal can be determined using Fourier transform techniques, which are known in the art. Furthermore, the term "power variance" as used throughout this detailed description and in the claims refers to the variance in the received power as a function of frequency.

Figure 15:
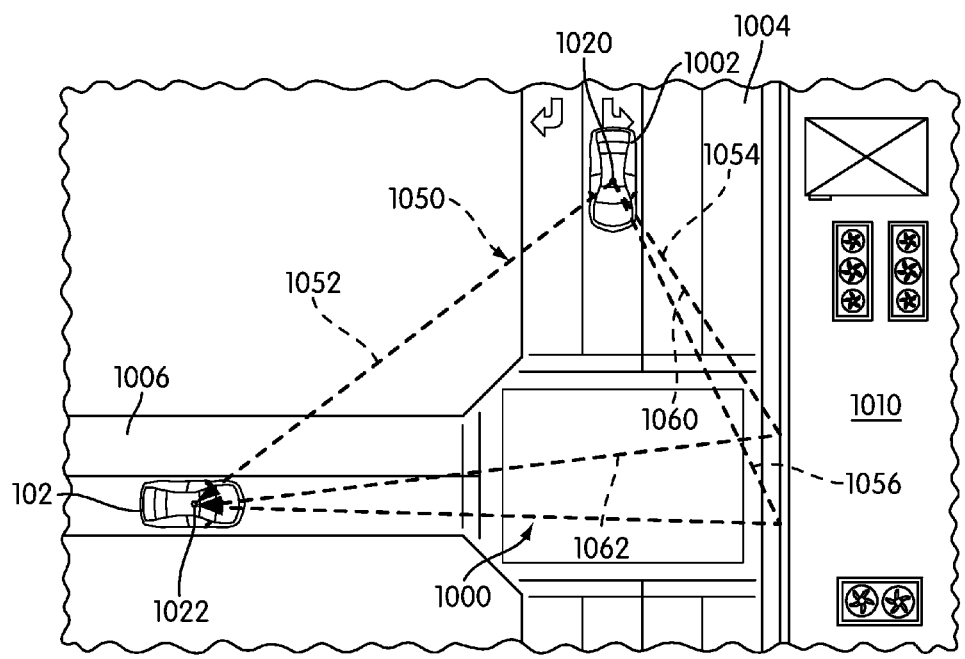
FIG. 15 is a schematic view of an embodiment of a target vehicle and a motor vehicle approaching an intersection with good line of sight.

FIG. 15 illustrates an embodiment of motor vehicle 102 and target vehicle 1002 in a similar scenario to that discussed above and shown in FIG. 10. In particular, motor vehicle 102 receives signal 1050 that has been transmitted from target vehicle 1002. Furthermore, in this case, motor vehicle 102 and target vehicle 1002 have line of sight of one another. Therefore, motor vehicle 102 receives both direct path components and reflected path components at second antenna 1022.

Figure 16:
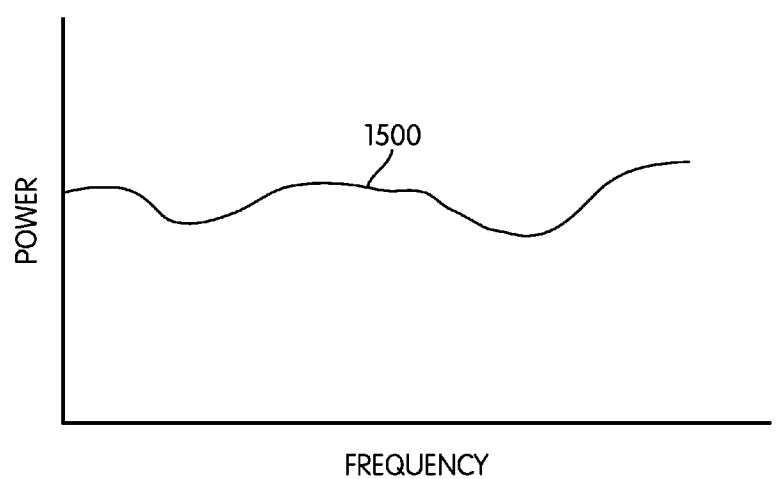
FIG. 16 is a schematic view of an embodiment of a relationship between power and frequency of a signal received at a receiving antenna of a motor vehicle.

FIG. 16 illustrates an embodiment of frequency response 1500 of signal 1050 received at motor vehicle 102. In particular, the power of signal 1050 is shown as a function of frequency. In situations where line of sight conditions occur, the received power does not change much as a function of the frequency. In other words, the measured power variance is relatively small.

Figure 17:
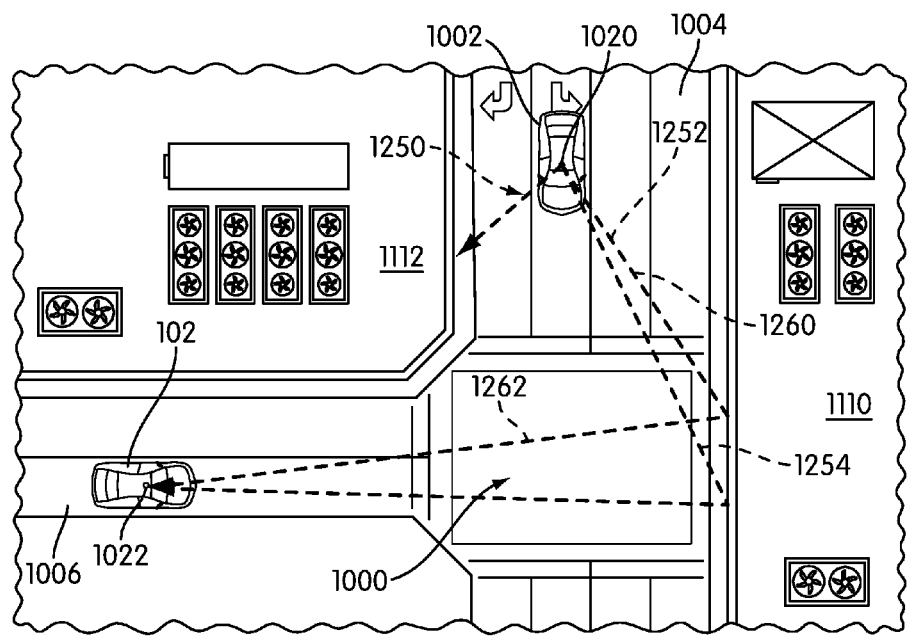
FIG. 17 is a schematic view of an embodiment of a target vehicle and a motor vehicle approaching an intersection with no line of sight.

FIG. 17 illustrates an embodiment of motor vehicle 102 and target vehicle 1002 in a similar scenario to that discussed above and shown in FIG. 12. In particular, motor vehicle 102 receives signal 1250 that has been transmitted from target vehicle 1002. In this case, however, motor vehicle 102 and target vehicle 1002 do not have line of sight of one another. Therefore, only reflected paths components of signal 1250 are received at second antenna 1022.

Figure 18:
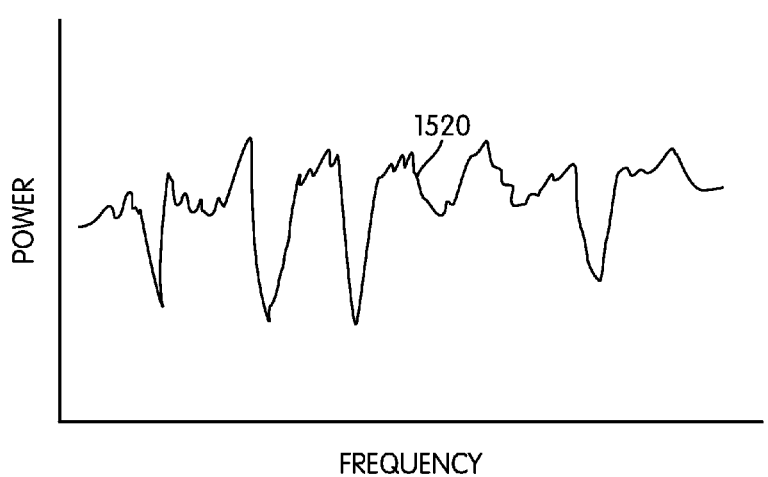
FIG. 18 is a schematic view of an embodiment of a relationship between power and frequency of a signal received at a receiving antenna of a motor vehicle.

FIG. 18 illustrates an embodiment of frequency response 1520 of signal 1050 received at motor vehicle 102. In particular, the power of signal 1250 is shown as a function of frequency. In this situation, since there is no line of sight, the received power varies dramatically as a function of the frequency. In other words, the power variance is relatively large.

Figure 19:
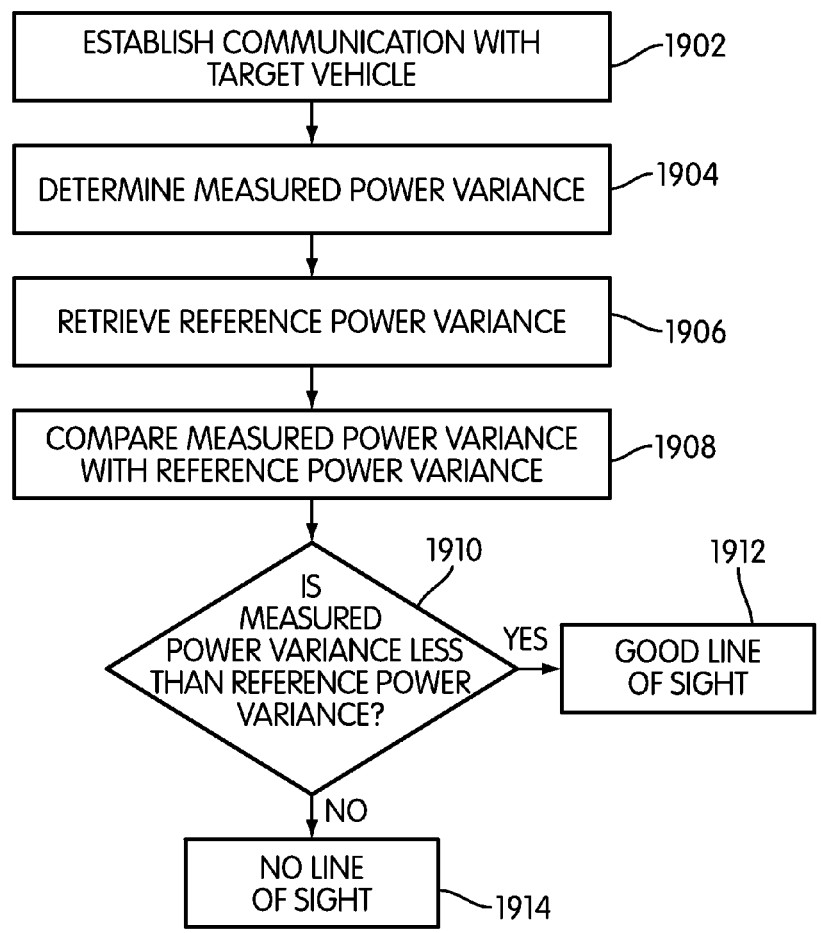
FIG. 19 is an embodiment of a process for determining line of sight.

FIG. 19 illustrates an exemplary embodiment of a general process for determining line of sight according to a frequency response of a signal. In particular, the process may be used to determine line of sight according to the measured power variance of the frequency response of a signal. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 1902, ECU 120 may establish a connection with a target vehicle using a vehicle communication network. Following step 1902, ECU 120 may proceed to step 1904. During step 1904, ECU 120 may calculate a measured power variance related to the frequency response of a received signal. In some cases, the measured power variance can be determined using information received from an antenna associated with motor vehicle 102. Next, during step 1906, ECU 120 can retrieve a reference power variance. Generally, ECU 120 may use any method for retrieving a reference power variance. In some cases, the reference power variance can be retrieved as a function of one or more parameters. In other cases, the reference power variance can be a constant value.

At this point, ECU 120 may proceed to step 1908, where the measured power variance is compared with the reference power variance. Following step 1908, ECU 120 may proceed to step 1910. During step 1910, ECU 120 may determine if the measured power variance is substantially less than the reference power variance according to the comparison made during step 1908. If, during step 1910, ECU 120 determines that the measured power variance is less than the reference power variance, then ECU 120 may proceed to step 1912, where it is determined that the driver of motor vehicle 102 has line of sight. Otherwise, ECU 120 may proceed to step 1914, where it is determined that the driver of motor vehicle 102 does not have line of sight.

It will be understood that any methods for determining a measured power variance for a signal can be used. In other words, the collision warning system discussed above could incorporate any hardware and/or software for determining frequency responses and power variances for various signals.

In another embodiment, a motor vehicle can include provisions for determining line of sight conditions by considering a correlation in the signals received at two different receiving antennas. The term "antenna correlation" as used throughout this detailed description and in the claims refers to the correlation between the frequency responses of two or more receiving antennas. In some embodiments, line of sight conditions can be determined using correlations between two frequency responses associated with a particular signal. For example, in embodiments where a motor vehicle includes two or more antennas to receive signals from a vehicle communication network, the motor vehicle may include provisions for correlating the frequency responses obtained at each antenna to determine line of sight conditions.

Figure 20:
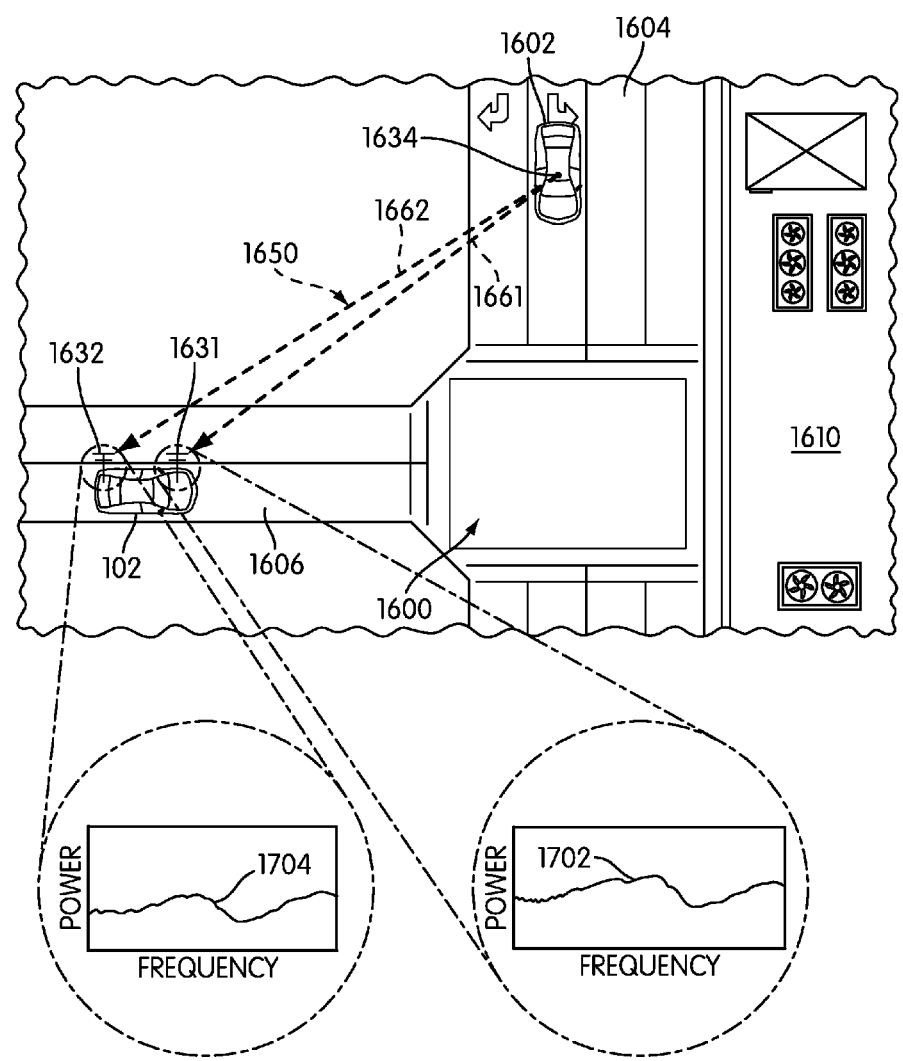
FIG. 20 is a schematic view of an embodiment of a target vehicle and a motor vehicle approaching an intersection with good line of sight.

FIG. 20 illustrates an embodiment of a motor vehicle configured to determine line of sight conditions according to an antenna correlation of a signal. Referring to FIG. 20, motor vehicle 102 is approaching intersection 1600 along second street 1606. In addition, target vehicle 1602 is approaching intersection 1600 along first street 1604. Furthermore, building 1610 is disposed on first street 1604. In this case, motor vehicle 102 is traveling in an approximately perpendicular direction to building 1610, while target vehicle 1602 is traveling in an approximately parallel direction to building 1610.

In some embodiments, motor vehicle 102 may be equipped with two or more antennas that are used for transmitting and receiving information over a vehicle communication network. In an exemplary embodiment, motor vehicle 102 may be equipped with first antenna 1631 and second antenna 1632. For purposes of illustration, first antenna 1631 and second antenna 1632 are shown to be associated with a front and rear of motor vehicle 102. However, it will be understood that in other embodiments, first antenna 1631 and second antenna 1632 could be disposed on any other regions of motor vehicle 102. In some cases, for example, first antenna 1631 and second antenna 1632 may be disposed adjacent to one another. Furthermore, while only two antennas are illustrated in the current embodiment, other embodiments could include more than two antennas for communicating over a vehicle communication network.

In this embodiment, target vehicle 1602 may transmit signal 1650 using antenna 1634. Due to the different locations for first antenna 1631 and second antenna 1632, signal 1650 may arrive at first antenna 1631 and second antenna 1632 over slightly different paths. As an example, first path component 1661 and second path component 1662 are both line of sight components, or straight line components, of signal 1650 from antenna 1634 to first antenna 1631 and second antenna 1632, respectively. Although only two path components of signal 1650 are illustrated in this embodiment, it will be understood that additional path components may arrive at first antenna 1631 and second antenna 1632, including various reflected path components.

In some embodiments, the frequency responses received at each antenna can vary according to the line of sight conditions between a motor vehicle and a target vehicle transmitting the signal. In some cases, the frequency responses received at each antenna may be substantially similar for situations where there is good line of sight between a motor vehicle and a target vehicle. In other words, the frequency responses may be highly correlated, yielding a relatively high value for the frequency response correlation. Furthermore, frequency responses received at each antenna may be substantially different in situations where there is not good line of sight between a motor vehicle and a target vehicle. In other words, the frequency responses between a motor vehicle and a target vehicle may not be correlated, yielding a relatively low value for the frequency response correlation.

The current embodiment illustrates the frequency response profiles associated with first antenna 1631 and second antenna 1632. In particular, FIG. 20 illustrates first frequency response profile 1702 and second frequency response profile 1704 associate with first antenna 1631 and second antenna 1632, respectively. In this case, first frequency response profile 1702 and second frequency response profile 1704 may be substantially similar. In other words, first frequency response profile 1702 and second frequency response profile 1704 may be highly correlated, which indicates good line of sight situations.

In an exemplary embodiment, a collision warning system may be configured to calculate a measured antenna correlation by comparing frequency response information obtained at two or more antennas. Generally, an antenna correlation can be calculated in any manner. Moreover, the measured antenna correlation can be compared with a reference antenna correlation to determine line of sight conditions. For a measured antenna correlation above a reference antenna correlation, the system can determine that a motor vehicle has line of sight to a target vehicle. If, however, the measured antenna correlation is below a predetermined or reference antenna correlation, the system can determine that the motor vehicle does not have line of sight to a target vehicle.

In one embodiment, collision warning system 100 may be configured to calculate a measured antenna correlation. In particular, collision warning system 100 may calculate a correlation that characterizes the similarity of the frequency response received at first antenna 1631 and the frequency response received at second antenna 1632. In the current embodiment, since first frequency response profile 1702 and second frequency response profile 1704 are strongly correlated, collision warning system 100 may determine that motor vehicle 102 does have line of sight of target vehicle 1602.

Figure 21:
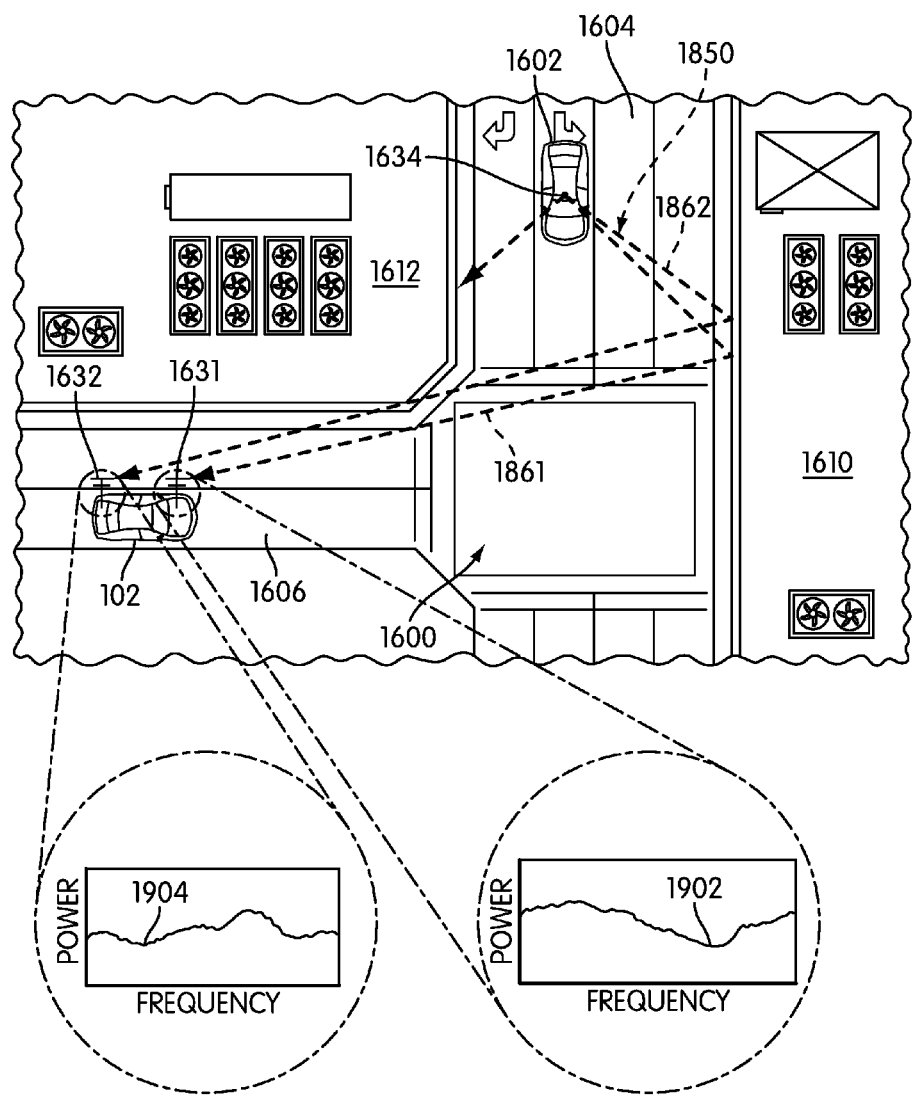
FIG. 21 is a schematic view of an embodiment of a target vehicle and a motor vehicle approaching an intersection with no line of sight.

Referring now to FIG. 21, in situations where no line of sight path exists between a motor vehicle and a target vehicle, the frequency response profile at each antenna may vary compared to line of sight situations. In this embodiment, second building 1612 is disposed at the corner of first street 1604 and second street 1606. In this case, the line of sight of a driver within motor vehicle 102 is obscured by second building 1612. For example, a driver within motor vehicle 102 is unable to see any vehicles on the portion of first street 1604 that is adjacent to second building 1612. In this situation, a driver within motor vehicle 102 is unable to see target vehicle 1602.

In this situation, signal 1850 is transmitted from antenna 1634 of target vehicle 1602 to first antenna 1631 and second antenna 1632 via first path component 1861 and second path component 1862, respectively. In this case, first path component 1861 and second path component 1862 are reflected path components, since second building 1612 prevents any line of sight component from reaching either first antenna 1631 or second antenna 1632.

In the current embodiment, the frequency response profiles associated with first antenna 1631 and second antenna 1632 are illustrated. In this case, first frequency response profile 1902 and second frequency response profile 1904 are associated with first antenna 1631 and second antenna 1632, respectively. In contrast to the profiles illustrated in FIG. 20, first frequency response profile 1902 and second frequency response profile 1904 are not strongly correlated. In this case, collision warning system 100 may determine that motor vehicle 102 does not have line of sight of target vehicle 1602.

Figure 22:
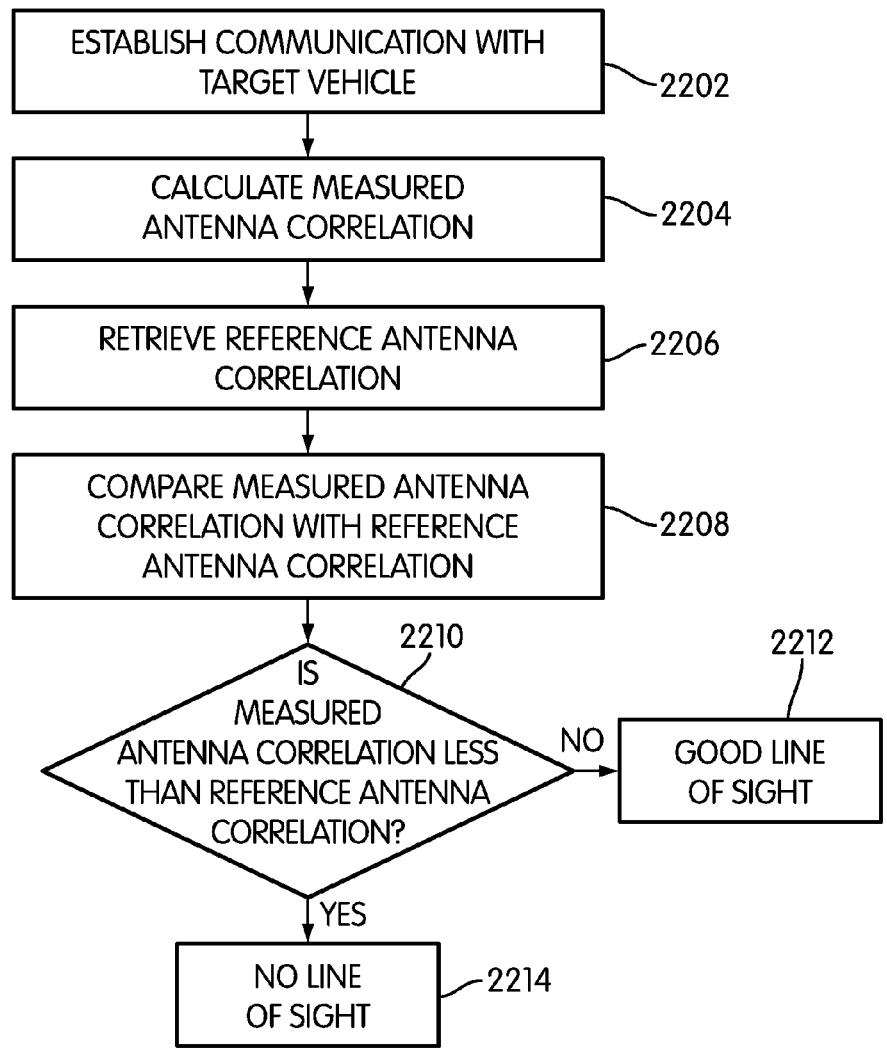
FIG. 22 is an embodiment of a process for determining line of sight.

FIG. 22 illustrates an exemplary embodiment of a general process for determining line of sight according to a frequency response correlation of a signal. In this embodiment, the following steps may be performed by ECU 120; however in some embodiments these steps may be performed by additional systems or devices associated with motor vehicle 102 and/or collision warning system 100. In addition, it will be understood that in other embodiments one or more of the following steps may be optional.

During step 2202, ECU 120 may establish a connection with a target vehicle using a vehicle communication network. Following step 2202, ECU 120 may proceed to step 2204. During step 2204, ECU 120 may calculate a measured antenna correlation related to received signals at two or more antennas. In some cases, the antenna correlation can be determined using information received from a first antenna and from a second antenna associated with motor vehicle 102. Moreover, in some cases, the antenna correlation may be determined from a correlation of the frequency responses at each antenna. Next, during step 2206, ECU 120 can retrieve a reference antenna correlation. In some cases, the reference antenna correlation could be retrieved as a function of one or more parameters. In other cases, the reference antenna correlation may be a constant function.

At this point, ECU 120 may proceed to step 2208, where the measured antenna correlation is compared with the reference antenna correlation. Following step 2208, ECU 120 may proceed to step 2210. During step 2210, ECU 120 may determine if the measured antenna correlation is substantially less than the reference antenna correlation according to the comparison made during step 2208. If, during step 2210, ECU 120 determines that the measured antenna correlation is not less than the reference antenna correlation, then ECU 120 may proceed to step 2212, where it is determined that the driver of motor vehicle 102 has line of sight. Otherwise, ECU 120 may proceed to step 2214, where it is determined that the driver of motor vehicle 102 does not have line of sight. It will be understood that in some embodiments, this comparison can be made over several time steps, rather than at a single time, since the frequency responses may be correlated at some times and uncorrelated at other times.

It will be understood that any methods for determining an antenna correlation for a signal can be used. In addition, any known algorithm for calculating a correlation between two frequency responses associated with distinct receiving antennas can be used. In other words, the collision warning system discussed above could incorporate any hardware and/or software for determining frequency responses and/or frequency response correlations for various signals.

In some embodiments, a collision warning system could be configured to determine line of sight conditions using more than one method. In some cases, for example, the collision warning system could determine line of sight conditions using both a RMS power delay spread of a signal as well as a frequency response correlation of the signal. This arrangement can help the collision warning system to more accurately determine line of sight conditions by utilizing two independent methods for determining line of sight conditions.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of operating a collision warning system in a motor vehicle, comprising the steps of:
   receiving a first impulse of energy from a first path component of a signal transmitted by a target vehicle;
   receiving a second impulse of energy from a second path component of the signal transmitted by the target vehicle;
   calculating a measured power delay spread characteristic from a power delay spread profile including both the first impulse and the second impulse, the measured power delay spread characteristic having a value;
   retrieving a reference power delay spread characteristic having a value;
   comparing the value of the measured power delay spread characteristic with the value of the reference power delay spread characteristic;
   determining a line of sight condition for the motor vehicle with respect to the target vehicle, wherein the line of sight condition is based on the comparison between the value of the measured power delay spread characteristic and the value of the reference power delay spread characteristic and wherein the line of sight condition indicates whether or not a line of sight exists between the motor vehicle and the target vehicle; and
   operating the collision warning system according to the line of sight condition.

2. The method according to claim 1, wherein the collision warning system is operated in an enhanced alert mode when the line of sight condition indicates that a line of sight does not exist between the target vehicle and the motor vehicle.

3. The method according to claim 2, wherein the collision warning system is operated in a normal alert mode when the line of sight condition indicates that a line of sight exists between the target vehicle and the motor vehicle.

4. The method according to claim 3, wherein the normal alert mode is different than the enhanced alert mode.

5. The method according to claim 1, wherein the collision warning system determines that a line of sight exists between the target vehicle and the motor vehicle when the value of the power delay spread characteristic is less than the value of the reference power delay spread characteristic.

6. The method according to claim 1, wherein the collision warning system determines that no line of sight exists between the target vehicle and the motor vehicle when the value of the power delay spread characteristic is greater than the value of the reference power delay spread characteristic.

7. The method according to claim 1, wherein the power delay spread characteristic is a root mean square power delay spread.

8. The method according to claim 1, wherein the power delay spread characteristic is a mean excess delay.

9. The method according to claim 1, wherein no line of sight exists between the motor vehicle and the target vehicle when an object blocks a third path component of the signal from being transmitted from the target vehicle to the motor vehicle.

* * * * *